(12) United States Patent
De Cino

(10) Patent No.: US 9,389,075 B2
(45) Date of Patent: Jul. 12, 2016

(54) CONDUIT-BENDING LEVEL

(71) Applicant: Nicholas Dominic De Cino, Longmont, CO (US)

(72) Inventor: Nicholas Dominic De Cino, Longmont, CO (US)

( * ) Notice: Subject to any disclaimer, the term of this patent is extended or adjusted under 35 U.S.C. 154(b) by 11 days.

(21) Appl. No.: 14/254,707

(22) Filed: Apr. 16, 2014

(65) Prior Publication Data

US 2015/0300818 A1 Oct. 22, 2015

(51) Int. Cl.
*G01C 9/34* (2006.01)

(52) U.S. Cl.
CPC ........................................ *G01C 9/34* (2013.01)

(58) Field of Classification Search
CPC .............. G01C 9/28; G01C 9/26; G01C 9/24; G01C 9/02; G01C 9/00
USPC ............................................ 33/371, 365, 379
See application file for complete search history.

(56) References Cited

U.S. PATENT DOCUMENTS

| | | | | | |
|---|---|---|---|---|---|
| 1,398,183 | A | * | 11/1921 | Fagrie | G01C 9/34 33/451 |
| 2,541,366 | A | * | 2/1951 | Kennedy | B25H 1/0085 33/373 |
| 2,842,863 | A | * | 7/1958 | Hellwig | G01C 9/28 33/371 |
| 4,274,208 | A | | 6/1981 | Yakkel | |
| 4,394,799 | A | * | 7/1983 | Moree | G01C 9/28 33/343 |
| 4,589,213 | A | * | 5/1986 | Woodward | G01C 9/28 33/343 |
| 5,058,407 | A | * | 10/1991 | Parker | B21D 7/063 33/371 |
| 5,154,000 | A | * | 10/1992 | Mahoney | B21D 7/14 33/343 |
| 5,167,075 | A | * | 12/1992 | Weldy | G01C 9/34 33/343 |
| 5,402,579 | A | * | 4/1995 | Smith | B25B 5/067 33/334 |
| D409,100 | S | * | 5/1999 | Brimer | D10/69 |
| 6,385,856 | B1 | * | 5/2002 | Godin | B21D 7/063 33/343 |
| 6,839,973 | B1 | * | 1/2005 | Woodward | G01C 9/28 33/343 |
| 9,021,710 | B2 | * | 5/2015 | Silberberg | G01C 9/28 33/371 |
| 9,151,606 | B2 | * | 10/2015 | Silberberg | G01C 9/34 33/373 |
| 9,243,907 | B2 | * | 1/2016 | Silberberg | G01C 9/26 33/347 |
| 2008/0271331 | A1 | * | 11/2008 | Allemand | G01C 9/34 33/371 |
| 2012/0151785 | A1 | * | 6/2012 | Lettkeman | G01C 9/28 33/301 |
| 2014/0007438 | A1 | * | 1/2014 | Silberberg | G01C 9/26 33/371 |
| 2015/0075017 | A1 | * | 3/2015 | Christianson | G01C 9/28 33/371 |

* cited by examiner

*Primary Examiner* — Yaritza Guadalupe-McCall
(74) *Attorney, Agent, or Firm* — Lathrop & Gage LLP

(57) ABSTRACT

A conduit-bending level has a pair of bubble levels oriented in such a manner as to facilitate the bending of conduit in a first plane and a second plane that is perpendicular to the first plane. This bending operation is preferably conducted without having to detach the conduit-bending level from the conduit in order to make the second bend.

7 Claims, 7 Drawing Sheets

CONDUIT-BENDING LEVEL

BACKGROUND

Electricians use conduit to contain and protect internal wiring. The conduit is usually mounted on wall or ceiling structure. The mounting operation requires custom fitting of the conduit by bending, cutting and joining operations.

U.S. Pat. No. 6,088,407 issued to Parker shows a bending machine that is used in conduit-fitting operations. The bending occurs in a vertical plane coincident with an elongate axis of symmetry in the tubing or conduit. A spirit or bubble level attaches by use of a thumbscrew to an opening of the distal end of the conduit to assist with bending operations. The spirit level is positioned to sense level in a horizontal plane, i.e., a plane that is perpendicular to the plane of bending. Proper use of the spirit level in this manner assures that the conduit bends are aligned such that the bent conduit as a final product will fit flush against a planar wall or ceiling that ultimately supports the conduit in the intended environment of use.

U.S. Pat. No. 5,167,075 issued to Weldy et al. shows a different type of conduit-bending level. This device has two spirit levels. The level is shaped as a "T" where the body of the level is shaped and sized to slide into the mouth of a conduit opening. A first spirit level senses in the horizontal plane perpendicular to the plane of bending, similar to what is seen in respect to Parker's '407 patent discussed above. A second spirit level is provided that can exist coaxially with the elongate or longitudinal axis of the conduit. The positioning of this second spirit level facilitates us of a protractor arm assembly where the second spirit level indicates when bending is achieved with respect to a degree as set by the protractor arm.

Another type of conduit-bending level is shown in U.S. Pat. No. 4,272,208 issued to Yakkel. This device is designed to fit over the mouth of the conduit opening and contains two spirit levels. Both spirit levels are oriented perpendicularly to the elongate axis of the conduit.

A problem exists in the art where conventional conduit-bending levels are intended for use in bending conduit in a single plane. Thus, for example, if there is a need to bend conduit 90° in a first transition from horizontal to up along the plane of the wall, the bending level must be repositioned on the conduit to make a second bend in a direction that is perpendicular to the plane of the wall. This need sometimes arises where the conduit must proceed in a different orientation to run along the ceiling of a room or to bridge the connecting corners of two walls. When the bending level is repositioned for the second bend, it is difficult or impossible to re-orient the level to sense at a true 90° with respect to the first bend orientation.

SUMMARY

The presently disclosed instrumentalities advance the art and overcome the problems outlined above by providing a conduit-bending level has a pair of bubble levels oriented in such a manner as to facilitate the bending of conduit in a first plane and a second plane that is perpendicular to the first plane. This bending operation is preferably conducted without having to detach the conduit-bending level from the conduit in order to make the second bend.

According to one embodiment, the conduit-bending level includes a body that projects a first tine and a second tine to present a gap therebetween. The gap presents an open end and is sized to receive a tubular body between the first and second tines. A thumbscrew includes a knob and a threaded member. The threaded member has a tip located remotely from the knob. At least one of the first and second tines has an internally threaded opening complementary to the threaded member and positioned for advancement and retraction of the tip in the gap by selective rotation of the knob. The body defines also an opening that presents an opening axis of symmetry. A first aperture proceeds through the opening in a first transverse axial orientation with respect to the opening axis of symmetry. A first bubble level is mounted in the first aperture with a first axial alignment operable to indicate a horizontal condition when tubing is bent in a first plane. A nose contains structure for mounting a second buddle level in transverse-normal axial orientation with respect to the first axial alignment of the first bubble level such that conduit may be bent in a second plane that is perpendicular to the first plane without having to detach the conduit-bending level from the conduit.

In one embodiment, the mounting structure for the second bubble level includes the body having a nose that defines a second aperture and there being a second bubble level mounted in the second aperture in transverse-normal orientation with respect to the first axial alignment of the first bubble level.

The conduit-bending level may be used by first attaching the conduit-bending level to the open mouth of a piece of conduit. The conduit is bent in a first plane by use of one of the first bubble level and the second bubble level to indicate a horizontal condition. After this first bend, the conduit may be rotated 90° for bending of the conduit in a second plane perpendicular to the first plane by use of the other one of the first bubble level and the second bubble level.

DETAILED DESCRIPTION

Figure 1:
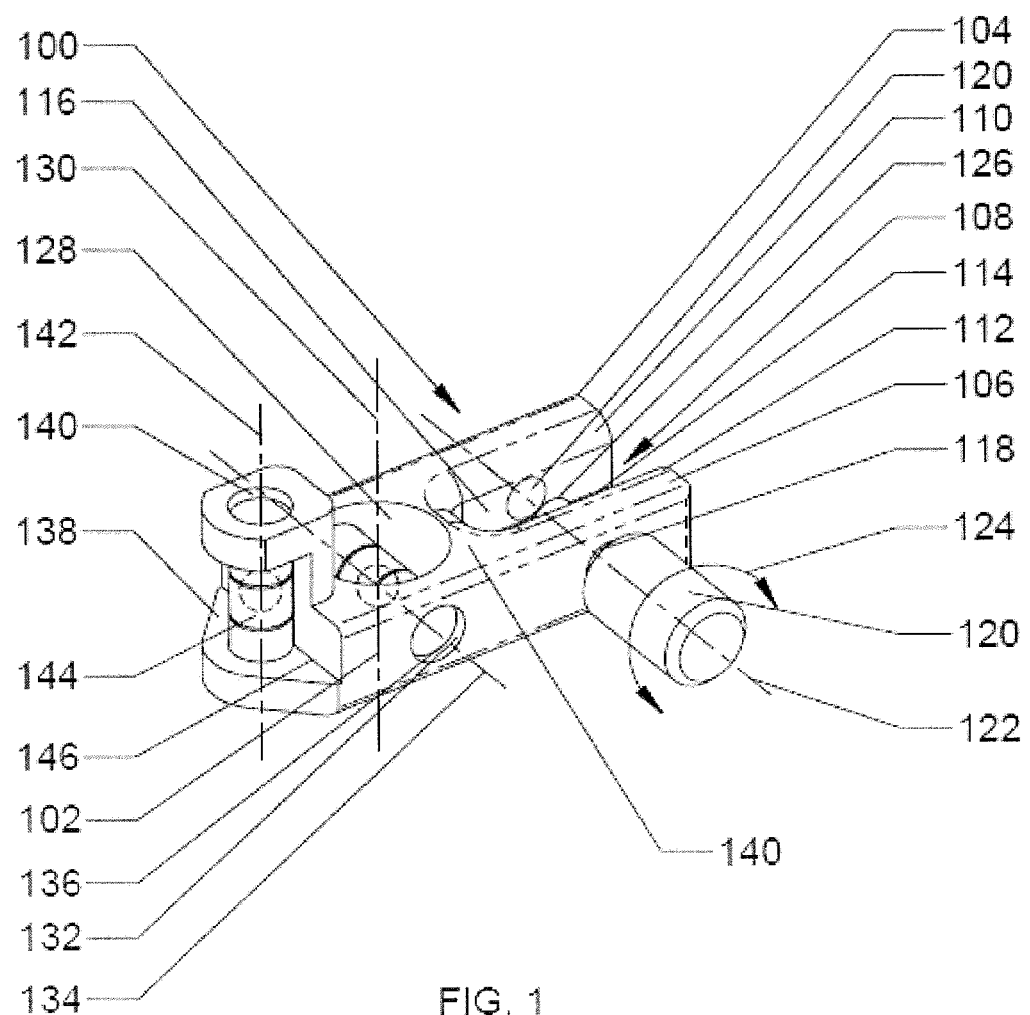
FIG. 1 is a top right front perspective view of a conduit-bending level according to one embodiment.

FIG. 1 shows a conduit-bending level 100 from a top right front perspective. A body 102 includes a first tine 104 and second tine 106, separated by gap 108. The tines 104, 106 optionally have radiused edges 111, 112, 114 proximate gap 108. As in the case of tine 104, the radiused edges 110, 114 may be separated by a flat face 116. This arrangement facilitates better alignment on the curved wall of tubing in the intended environment of use. Tine 106 defines an internally threaded aperture for receipt of a thumbscrew 120. The thumbscrew 120 is alternatively received in internally threaded aperture 120 in tine 104, as befits right or left-handed operation of the conduit-bending level 100. The thumbscrew 120 presents an axis of elongation 122 indicating a path of travel that is achieved commensurate with selective rotation of the thumbscrew 120 on arc 124 to advance or retreat pointed tip 126 within gap 108.

The body 102 defines an aperture 128 extending with an elongate axis of symmetry 130 in transverse-normal orientation with respect to the axis of elongation 122. An opening 132 crosses aperture 128 with an elongate axis of symmetry 134 extending in transverse-normal relationship with respect to the elongate axis of symmetry 130 and in parallel with axis of elongation 122. A first spirit or bubble level 136 is received within the opening 132 and is operable for viewing to indicate a level condition from within the aperture 128 when face 140 is horizontal or, more particularly, when the elongate axis of symmetry 136 is in a horizontal plane.

The body 102 includes a nose 138 that projects outwardly from face 140. The nose 138 contains a through opening 140 presenting an elongate axis of symmetry 142 that runs in a transverse-normal orientation with respect to the axis of elongation 122. A second spirit or bubble level 144 resides in the through opening 140. The structure that defines through-opening 140 is partially removed to create a shelf area 146 for viewing of the bubble level 144 to indicate a level condition when face 140 is perpendicular to horizontal or, more particularly, when the elongate axis of symmetry 142 is in the horizontal plane.

Figure 2:
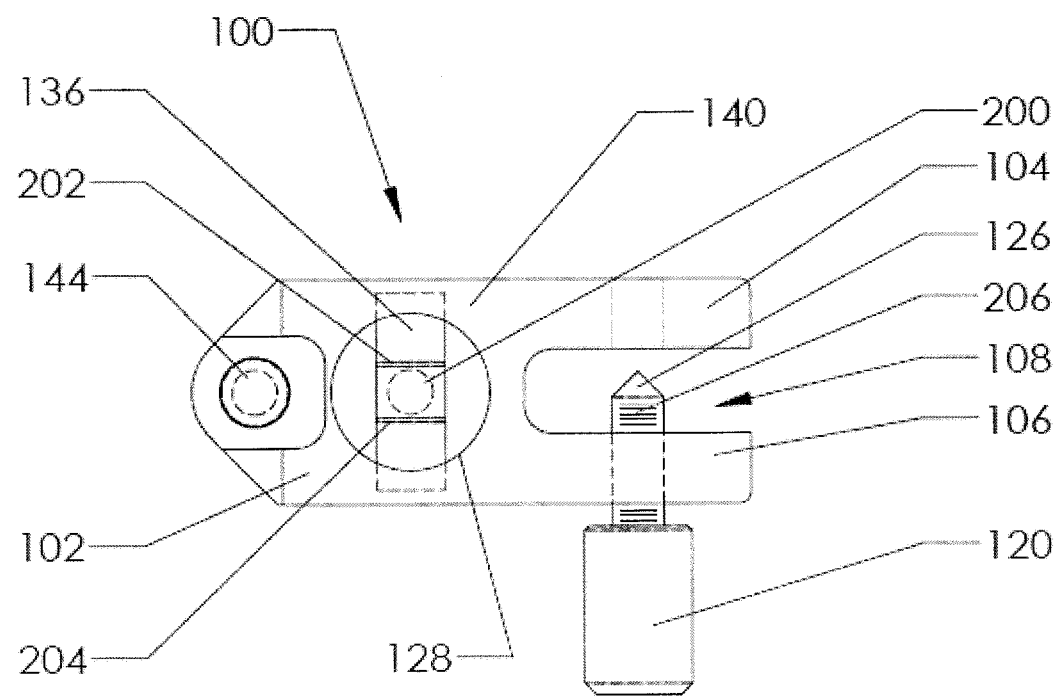
FIG. 2 is a top plan view thereof.

FIG. 2 is a top plan view that provides additional detail of the conduit-bending level 100 shown with respect to FIG. 1 and retains like numbering of identical parts. It will be appreciated that when face 140 is horizontal, as shown in FIG. 2, a bubble 200 located between lines 202, 204, indicates a level condition. Rotation of the thumbscrew 120 advances and retracts pointed tip 126 within gap 108 by the action of threaded male member 206 interacting with the internally threaded aperture 118 (not shown in FIG. 2). As shown in FIG. 2, the tines 104, 106 are not radiused, since radiusing is an option according to one embodiment of what is shown and described.

Figure 3:
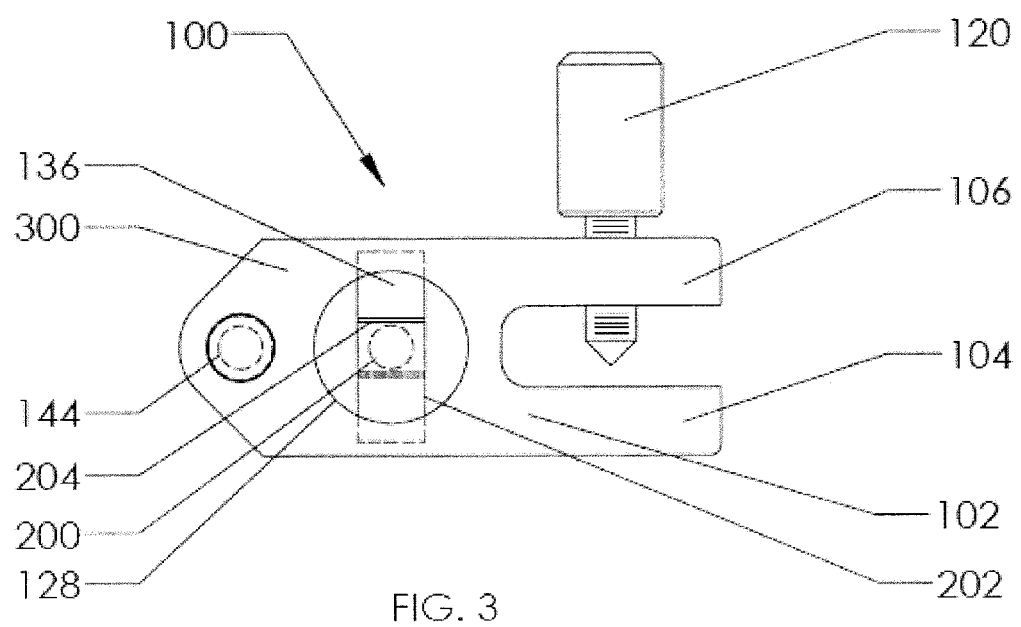
FIG. 3 is a bottom plan view thereof.

FIG. 3 is a bottom plan view of the conduit-bending level 100. The bubble 200 is viewable from a bottom perspective when bottom face 300 is horizontal.

Figure 4:
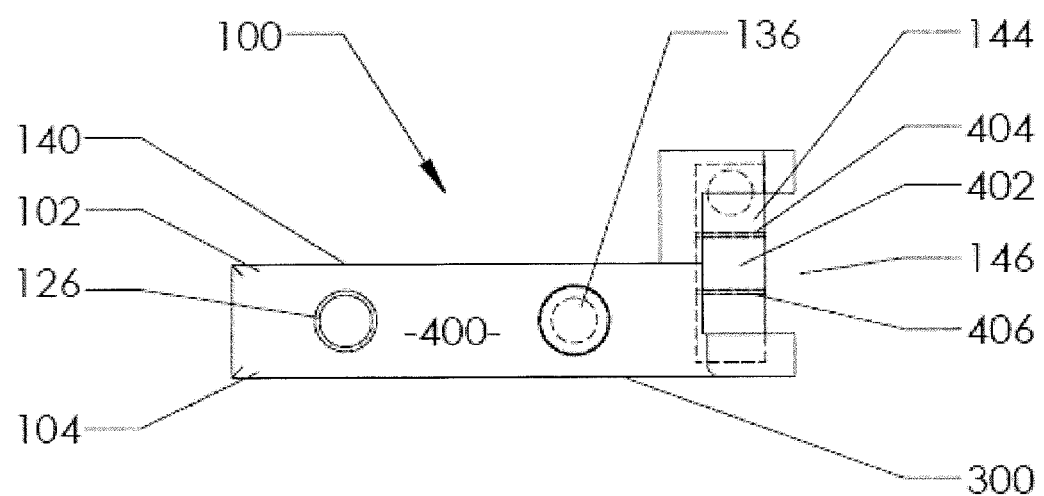
FIG. 4 is a left side elevation view thereof.
Figure 5:
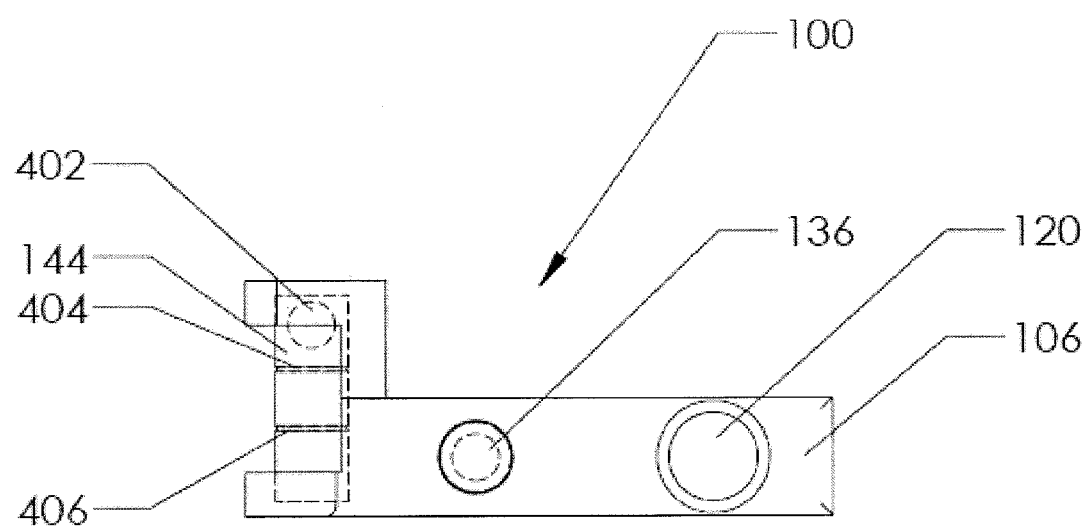
FIG. 5 is a right side elevation view thereof.

FIG. 4 is a left side elevation view of the conduit-bending level 100. In this case, the faces 140, 300 are in a horizontal position, so bubble level 144 as shown in FIG. 4 does not indicate a level condition relative to wall 400 where bubble 404 is outside of lines 406, 408. FIG. 5 is a right side elevation view of the conduit-bending level 100 indication also a non-level condition as indicated by the bubble level 144.

Figure 6:
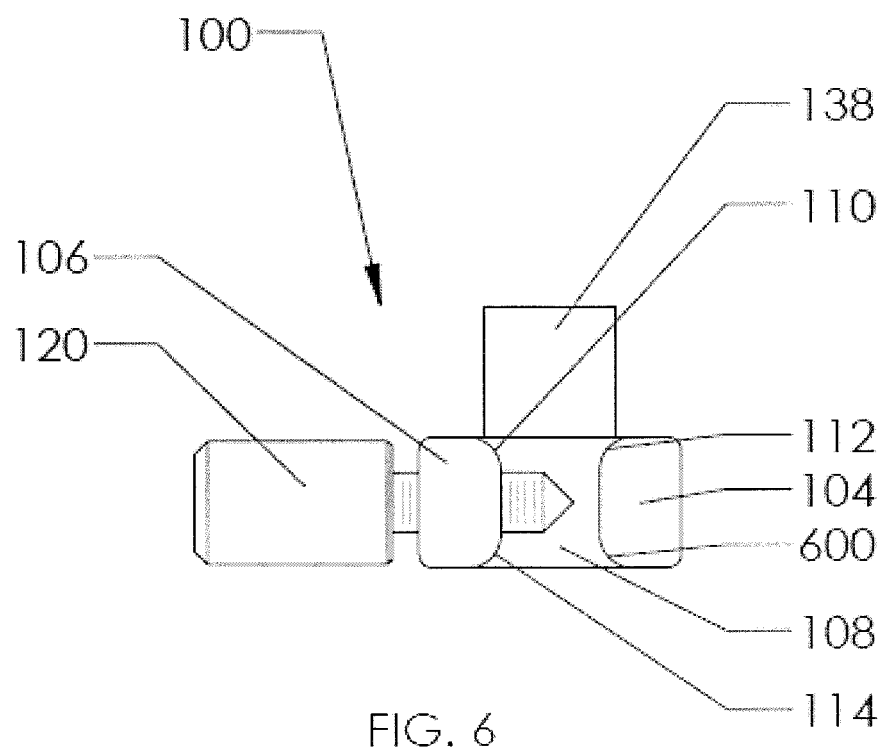
FIG. 6 is a rear plan view thereof.
Figure 7:
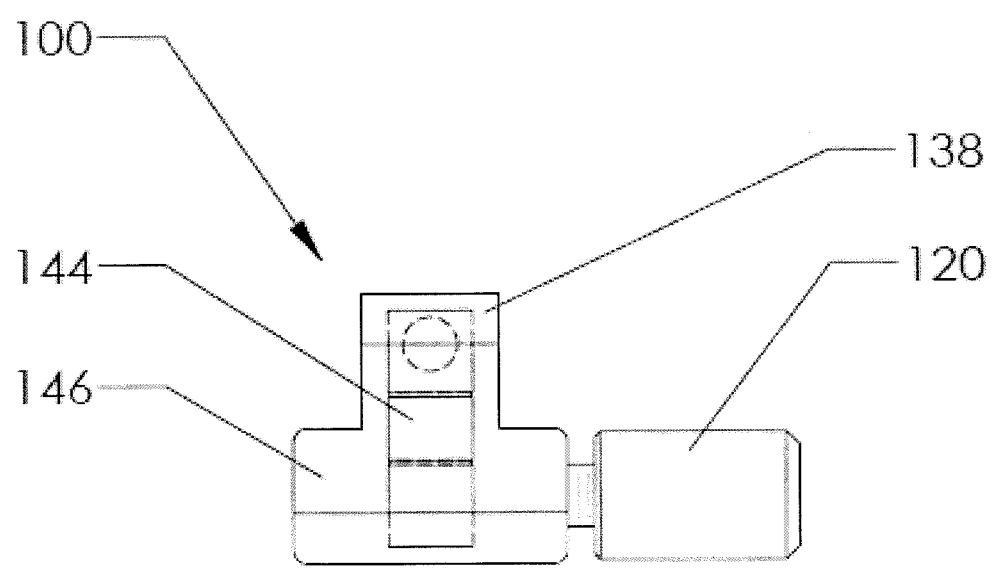
FIG. 7 is a front plan view thereof.

FIG. 6 is a rear plan view of the conduit-bending level 100, and FIG. 7 is a front plan view thereof. These views provide additional detail with respect to what is shown with respect to FIG. 1. Concerning FIG. 6, it will be appreciated that the radiusing 600 facilitates tool application to a wide variety of piping diameters. The radiusing reduces stress concentration in the tines, together with wear and tear on the tines. If the radius is not provided then it remains necessary to debur the tool edge, so the radiusing does not add an extra machining process step. The radiusing on both tines is the same. The gap 108 has an open rear end 602 for the receipt of tubing or conduit. Bending proceeds on a machine, for example, as shown in U.S. Pat. No. 6,088,407 where the first bubble level 136 assures that bending occurs in a first vertical plane that is normal to horizontal. The conduit 600 may then be rotated 90° as shown in FIG. 8 while keeping the conduit-bending level 100 in place on the conduit. Use of the second bubble level 144 in this rotated position assures that bending occurs in a plane that is perpendicular or normal to the first vertical plane. Much trouble and uncertainty over alignment is thereby eliminated.

Those skilled in the art will appreciate that the foregoing discussion teaches by way of example, and not by limitation. Insubstantial changes may be made with respect to what is shown and described without departing from the true scope and spirit of the claimed invention. Accordingly, the inventor hereby states his intent to rely upon the Doctrine of Equivalents in protecting the invention.

The invention claimed is:

1. A conduit-bending level, comprising:
  a body that projects a first tine and a second tine to present a gap therebetween, the gap presenting an open end such that is sized to receive a tubular body between the first and second tines;
  a thumbscrew including a knob and a threaded member,
  the threaded member having a tip located remotely from the knob,
  at least one of the first and second tines having a threaded opening complementary to the threaded member and positioned on a path of travel for advancement and retraction of the tip in the gap by selective rotation of the knob,
    the threaded member having an axis of elongation in parallel to the path of travel;
  the body defining a first aperture that presents a first elongate axis symmetry in transverse-normal relationship to the axis of elongation in the threaded member;
  the body defining an opening that proceeds through the aperture in a transverse-normal axial orientation with respect to the elongate axis;
  a first bubble level mounted in the opening with a first axial alignment operable to indicate a horizontal condition in parallel with the axis of elongation in the threaded member when tubing is bent in a first plane; and
  means for mounting a second bubble level in transverse-normal axial orientation with respect to the first axial alignment of the first bubble level such that conduit may be bent in a second plane that is perpendicular to the first plane without having to detach the conduit-bending level from the conduit,
  wherein the means for mounting includes a through-opening presenting a second elongate axis in parallel to the opening axis and perpendicular to the elongate axis of the threaded member,
  the through opening having structure removed to create a shelf area for viewing the second bubble level to indicate a level condition when the second elongate axis of symmetry is horizontal.

2. The conduit-bending level of claim 1 wherein the means for mounting includes the body having a nose that defines the second aperture and the second bubble level mounted in the second aperture in transverse-normal orientation with respect to the first axial alignment of the first bubble level.

3. The conduit-bending level of claim 1, wherein each of the first and second tines have radiused edges proximate the gap.

4. The conduit-bending level of claim 2, wherein the nose has a shelf that presents an opening for viewing of the second bubble level.

5. The conduit-bending level of claim 1, wherein the tip of the threaded member is a pointed tip.

6. The conduit-bending level of claim 1, wherein each of the first and second tines include an internally threaded aperture for receipt of the thumbscrew.

7. A method of bending conduit by use of the conduit-bending level of claim 1, the method comprising the steps of:
  attaching the conduit-bending level to the open mouth of a piece of conduit; bending the conduit in a first plane by use of one of the first bubble level and the second bubble level;
  rotating the conduit 90° with respect to the first plane without detaching the conduitbending level; and
  bending the conduit in a second plane perpendicular to the first plane by use of the other of the first bubble level and the second bubble level.

* * * * *